(12) United States Patent
Nakaya (10) Patent No.: US 11,833,984 B2
(45) Date of Patent: *Dec. 5, 2023

(54) IN-VEHICLE EQUIPMENT CONTROLLER AND VEHICLE CONTROL SYSTEM

(71) Applicant: Mazda Motor Corporation, Hiroshima (JP)

(72) Inventor: Yusuke Nakaya, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 102 days.

This patent is subject to a terminal disclaimer.

(21) Appl. No.: 17/160,377

(22) Filed: Jan. 28, 2021

(65) Prior Publication Data
US 2021/0268973 A1 Sep. 2, 2021

(30) Foreign Application Priority Data
Feb. 27, 2020 (JP) ................................ 2020-032206

(51) Int. Cl.
| | | |
|---|---|---|
| *B60R 16/023* | (2006.01) | |
| *E05F 15/60* | (2015.01) | |
| *B60R 16/037* | (2006.01) | |
| *G06F 13/40* | (2006.01) | |
| *H04L 12/40* | (2006.01) | |

(52) U.S. Cl.
CPC ........ *B60R 16/0231* (2013.01); *B60R 16/037* (2013.01); *E05F 15/60* (2015.01); *G06F 13/404* (2013.01); *H04L 12/40* (2013.01); *E05Y 2900/55* (2013.01); *H04L 2012/40273* (2013.01)

(58) Field of Classification Search
CPC .... B40R 16/0231; B40R 16/037; E05F 15/60; G06F 13/404; H04L 12/40; H04L 2012/40273; E05Y 2900/55
See application file for complete search history.

(56) References Cited

U.S. PATENT DOCUMENTS

| | | | |
|---|---|---|---|
| 6,553,223 B1 * | 4/2003 | Bayley | G06F 13/102 455/418 |
| 6,741,639 B1 * | 5/2004 | Yoshida | H04B 1/0003 375/220 |
| 2021/0273824 A1 * | 9/2021 | Nakaya | G06F 9/4411 |
| 2021/0273997 A1 * | 9/2021 | Nakaya | H04L 12/40 |

FOREIGN PATENT DOCUMENTS

JP 2017-105362 A 6/2017

* cited by examiner

*Primary Examiner* — Henry Tsai
*Assistant Examiner* — John B Roche
(74) *Attorney, Agent, or Firm* — XSENSUS LLP (57) ABSTRACT

To reduce software development man-hours when vehicle models are developed an in-vehicle equipment controller includes a CPU and memory. The CPU has, as a software configuration, an application layer, a middleware layer, and a device driver. In the middleware layer, a first communication packet on the application side and a second communication packet on a device driver side are installed. In the middleware layer, a communication path between the application layer and the device driver is generated based on a mapping table stored in the memory.

14 Claims, 5 Drawing Sheets

IN-VEHICLE EQUIPMENT CONTROLLER AND VEHICLE CONTROL SYSTEM

CROSS-REFERENCE TO RELATED APPLICATION

This application claims priority from Japanese Application No. 2020-032206, filed on Feb. 27, 2020, the contents of which are incorporated by reference herein in its entirety.

TECHNICAL FIELD

A technique disclosed herein belongs to a field related to an in-vehicle equipment controller and a vehicle control system.

BACKGROUND

In recent years, development of automated driving systems has been promoted nationally, and almost all actuators provided in vehicles are subjected to electronic control. Controllers that control these actuators often have a software structure that complies with standards of Automotive Open System Architecture (AUTOSAR).

For example, a control system that has a software structure based on the standards of AUTOSAR is disclosed in Patent document 1. In the control system, information on a sender, a recipient, and a data type is included in advance in communication data. Then, in an application layer, a communication interface service that is selected according to the data type and a hierarchy of one of the sender and the recipient recognized by the other thereof is adopted for the communication data.

PATENT DOCUMENTS

[Patent document 1] JP-A-2017-105362

SUMMARY

Problem to be Solved

By the way, in a hierarchical software architecture such as AUTOSAR, an application invokes an application programming interface (API) that is provided by a device driver of each peripheral, and exchanges I/O.

In such a case, when a connection port of the device is changed, when a signal mode of the I/O of the device or a mode of exchanged information is changed, or the like, a source code that invokes the API of the application has to be changed. As a result, software development man-hours are increased.

A technique disclosed herein has been made in view of the above point and therefore has a purpose of reducing software development man-hours.

In order to solve the above problem, the technique disclosed herein provides an in-vehicle equipment controller including a control section that controls in-vehicle equipment and a storage section. The control section has, as a software configuration: an application layer in which an application implementing functions for the in-vehicle equipment is installed; and a middleware layer in which a device driver, one or a plurality of first communication packets, and a plurality of second communication packets are installed. The device driver converts a command received from the application into a hardware command, the first communication packet exchanges data with the application, and the second communication packets exchange data with the device driver. A rewritable mapping table that specifies a connection relationship between the first communication packet and each of the second communication packets is stored in the storage section. In the middleware layer, a communication path between the application layer and the device driver is generated on the basis of the mapping table.

According to this aspect, even in the case where in-vehicle equipment connected to the in-vehicle equipment controller is changed, or even in the case where a connection destination port is changed, the in-vehicle equipment can be operated by rewriting the table in a mapping module without correcting a code related to an application interface. In this way, it is possible to significantly reduce software development man-hours when a vehicle model is changed or when vehicle models are developed.

In addition, the technique disclosed herein provides a vehicle control system including: a plurality of zone ECUs, each of which is arranged per specified zone in a vehicle; and a central processing unit that controls the plurality of the zone ECUs. The one or the plurality of the zone ECUs include the in-vehicle equipment controller in the above aspect.

In the case where the vehicle is provided with the plurality of the zone ECUs and those are managed by the central processing unit, the in-vehicle equipment is connected to the zone ECU. At this time, a connection destination of the in-vehicle equipment may be changed. However, with the configuration in this aspect, it is possible to significantly reduce software development man-hours for both of the central processing unit and the zone ECUs.

The disclosure describes various advantages including, according to the technique disclosed herein, it is possible to significantly reduce the software development manhours when vehicle models are developed.

DETAILED DESCRIPTION

A detailed description will hereinafter be made on an exemplary embodiment with reference to the drawings.

(Vehicle Control System)

Figure 1:
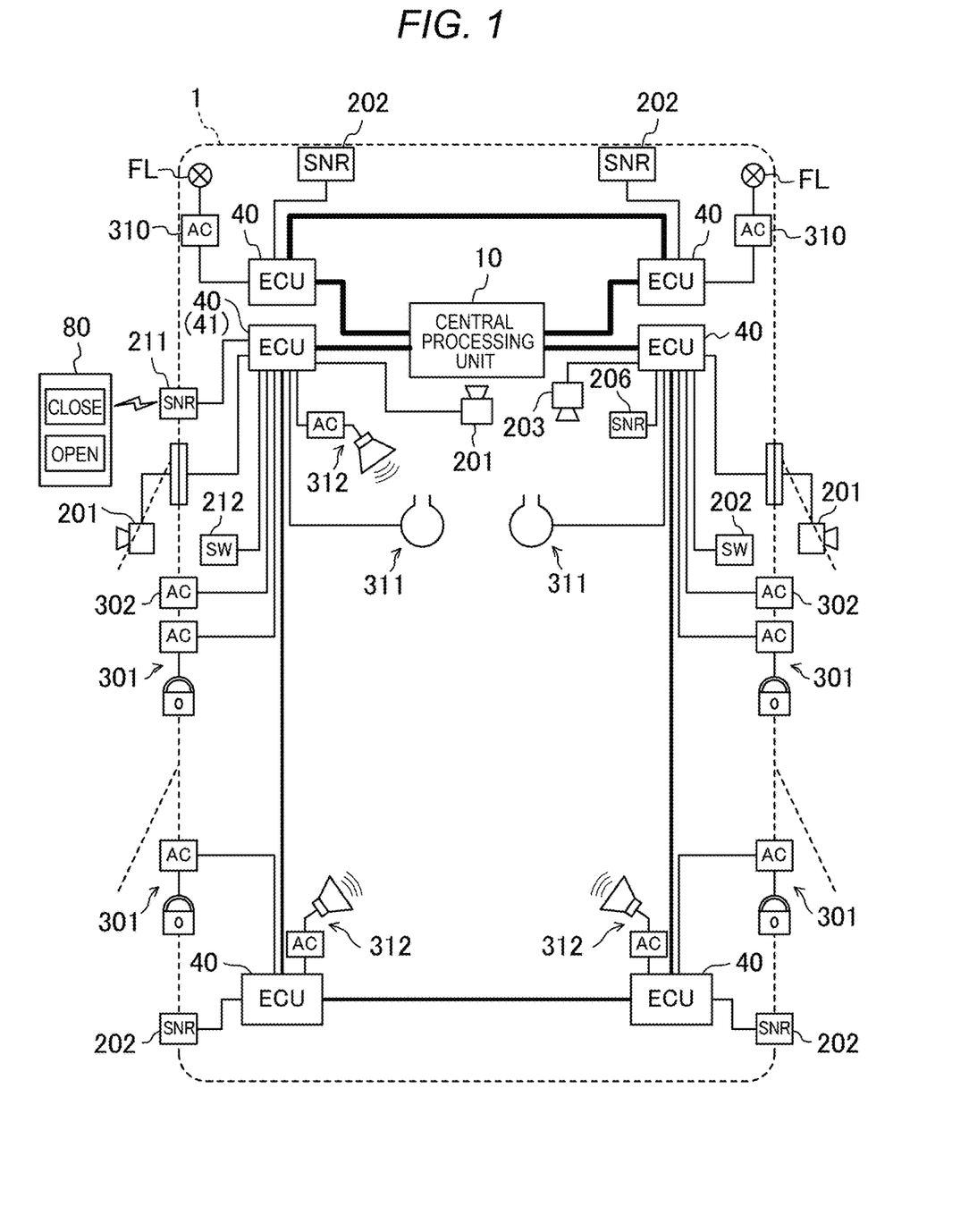
FIG. 1 is a view illustrating a configuration example of a vehicle control system.

FIG. 1 is a view illustrating a configuration example of a vehicle control system. The vehicle control system illustrated in FIG. 1 is mounted on a vehicle 1, and includes: plural zone ECUs 40, each of which is arranged per specified zone in the vehicle 1; and a central processing unit 10 that controls the plural zone ECUs 40. In this embodiment, an example in which the vehicle control system divides the vehicle 1 into six zones and the zone ECU 40 is provided to each of the zones will be described. The zone ECU 40 is configured that in-vehicle equipment can be connected thereto. In addition, the zone ECU 40 has a function as a network hub device that relays information transferred via an in-vehicle network. For convenience of the description, the zone ECU 40 that is arranged in a front left zone on a front left side of the vehicle 1 may be referred to as a first zone ECU 41.

<In-Vehicle Equipment>

In-vehicle equipment 20 includes: input equipment including a sensor device 200 and a signal reception device; and an actuator 300.

<<Sensor Device, Signal Reception Device>>

For example, the sensor device 200 can include: (1) plural cameras 201 that are provided to a body or the like of the vehicle 1 to capture images of external environment; (2) plural radars 202 that are provided to the body or the like of the vehicle 1 to detect an external object and the like; (3) a position sensor that detects a position of the vehicle 1 (vehicle position information) by using the Global Positioning System (GPS); (4) a vehicle state sensor that is constructed of a sensor group for detecting behavior of the vehicle such as a vehicle speed sensor, an acceleration sensor, and a yaw rate sensor and acquires a state of the vehicle 1; (5) an occupant state sensor that includes an in-vehicle camera 203 and the like to acquire a state of an occupant in the vehicle 1; (6) a driving operation sensor 206 that detects a driving operation by a driver; and (7) a sensor 211 that actuates a keyless device (hereinafter referred to as a keyless sensor 211). Examples of the driving operation sensor 206 are an accelerator pedal position sensor, a steering angle sensor, a brake hydraulic pressure sensor, and the like. For example, the keyless sensor 211 includes: a receiver that receives an unlocking/locking signal from a keyless remote controller 80; and a motion sensor that detects approach of the driver who has a key or contact of the driver with a door knob. The sensor device 200 includes a switch that detects an operation by the occupant. Examples of the switch are a power window (PW) switch 212 that is used by the occupant to operate an electric power window, a washer fluid level switch, and a hood switch.

For example, the signal reception device includes an external network and a receiver that receives a signal from another vehicle.

<<Actuator>>

The actuators 300 include an actuator for a drive system, an actuator for a steering system, an actuator for a brake system, and the like. Examples of the actuator for the drive system are an engine, a transmission, and a motor. An example of the actuator for the brake system is a brake. An example of the actuator for the steering system is a steering wheel. In addition, examples of the actuator 300 are a locking device 301 that locks a side door, an electric power window device 302, a lighting controller 310 that controls lighting of a head lamp FL, an airbag system 311, and a sound system 312.

[In-Vehicle Equipment Controller]

An in-vehicle equipment controller 100 is mounted in one or a plurality of the zone ECUs 40. That is, the in-vehicle equipment controller 100 may be mounted in all of the zone ECUs or some of the zone ECUs. In addition, the in-vehicle equipment controller 100 (1) may be mounted on the central processing unit 10 or (2) may be mounted on a dedicated ECU that is connected to a lower hierarchy of the zone ECU 40 and is provided exclusively to each of the actuators. An example of the dedicated ECU is an engine driving ECU for driving the engine. The central processing unit 10 and the ECUs may each be constructed of a single integrated circuit (IC) or may each be constructed of the plural ICs.

Figure 2A:
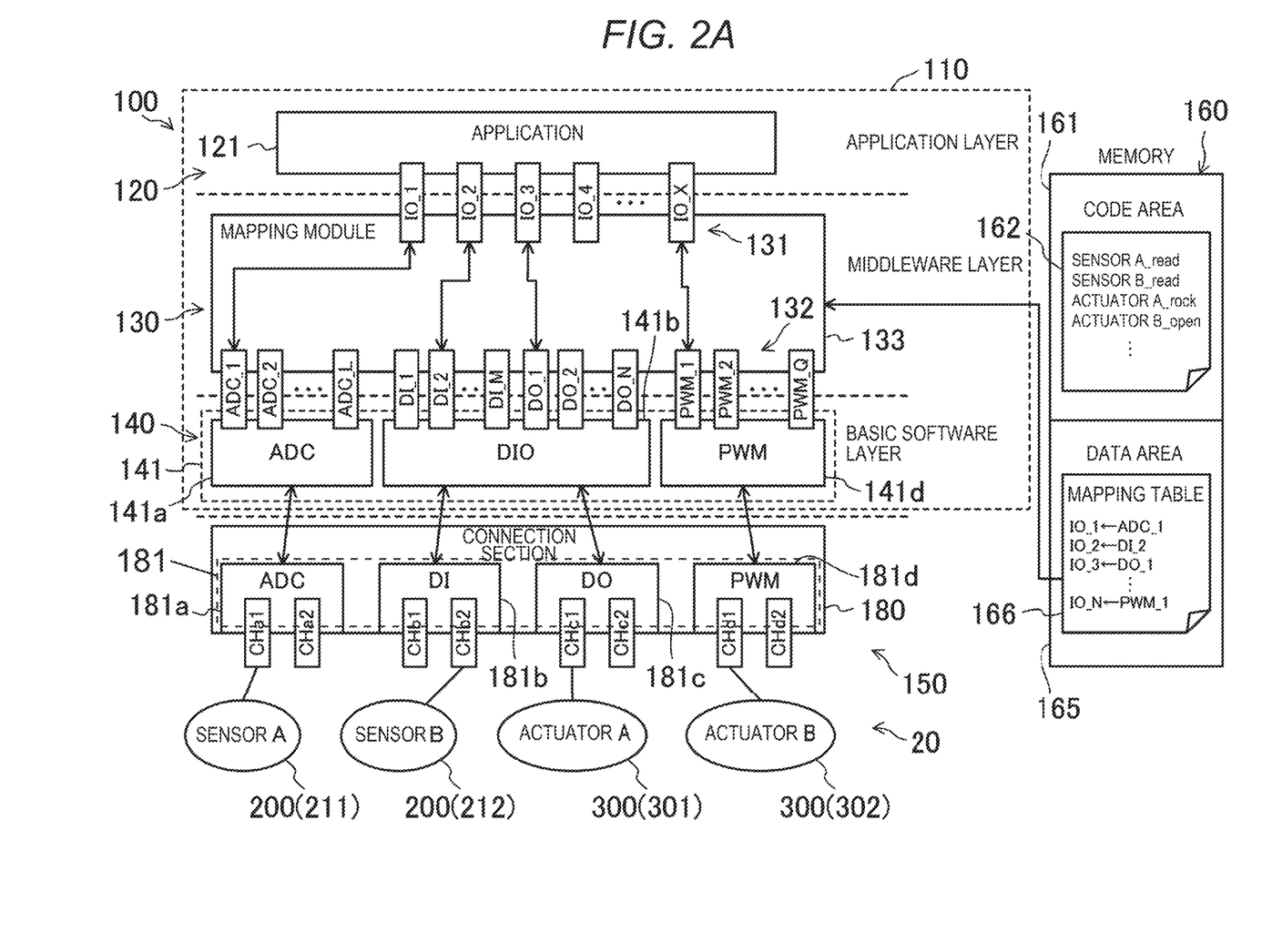
FIG. 2A is a view illustrating a configuration example of an in-vehicle equipment controller according to an embodiment.

FIG. 2A is a block diagram illustrating a configuration example of the in-vehicle equipment controller 100. For example, the in-vehicle equipment controller 100 is constructed of a CPU 150 (a processor) and memory 160.

<CPU>

The CPU 150 performs various types of processing by loading and running a program 162 from the memory 160. More specifically, for example, the CPU 150 reads detection data from the sensor device 200, performs various types of arithmetic processing to implement various functions, and generates and outputs a control signal for controlling the actuator 300. The CPU 150 is an example of the control section, and the memory 160 is an example of the storage section. A specific aspect of the CPU 150 is not particularly limited. For example, functions of the CPU 150 may be installed by a microcomputer or a system on a chip (SoC).

<<Hardware>>

As a hardware configuration, the CPU 150 includes: an arithmetic section that performs various types of arithmetic processing according to a program stored in the memory 160; and a peripheral function unit 180. A peripheral described herein means the in-vehicle equipment 20 that is used in combination with the central processing unit 10 and/or the zone ECU 40.

The peripheral function unit 180 includes one or a plurality of peripheral function sections 181 to function the peripheral, that is, the in-vehicle equipment 20. As illustrated in FIG. 2A, examples of the peripheral function section 181 are an analog-to-digital converter 181a (hereinafter referred to as an ADC 181a), a digital input section 181b, a digital output section 181c, and a PWM control section 181d. As the peripheral function sections 181, only one or some of the components 181a to 181d may be implemented, or another component may be implemented. An example of the other component is an analog input/output section. In the following description, in the case where peripheral functions of the ADC 181a, the digital input section 181b, the digital output section 181c, and the PWM control section 181d are described without being distinguished from each other, these will simply be described as the peripheral function sections 181.

Each of the peripheral function sections 181 has plural channels. Each of the channels is configured that an input/output section (for example, a connector for I/O connection) of the in-vehicle equipment 20 can be connected thereto. FIG. 2A illustrates an example in which, as the above channels, input channels CHa1, CHa2 are provided to the ADC 181a, input channels CHb1, CHb2 are provided to the digital input section 181b, output channels CHc1, CHc2 are provided to the digital output section 181c, and output channels CHc1, CHc2 are provided to the PWM control section 181d. The number of the channels is not limited to two and may be three or more. In addition, both of input and output channels may be provided to the single peripheral function section 181.

The CPU 150 has, as a software configuration 110, the highest application layer 120, a lower middleware layer 130 than the application layer 120, and a lower basic software layer 140 than the middleware layer 130. A software structure that complies with so-called AUTOSAR may be adopted for the CPU 150. In this case, the application layer 120 corresponds to an application layer of AUTOSAR and is configured to include one or a plurality of Software Component (SWC) modules, for example. The basic software layer 140 and the middleware layer 130 correspond to Basic Software (BSW) of AUTOSAR, and the basic software layer 140 corresponds to a Microcontroller Abstraction Layer of AUTOSAR. The middleware layer 130 may be implemented as a Complex Driver.

In the application layer 120, an application 121 that has functions for the in-vehicle equipment 20 is installed. An application having a well-known configuration can be adopted for the application 121. A specific example of the application 121 will be described below.

In the basic software layer 140, a device driver unit 141 that converts a command received from the application 121 into a hardware command is installed. In the device driver unit 141, a device driver for each of the peripheral function sections 181 included in the peripheral function unit 180 is installed. As described above, in the example illustrated in FIG. 2A, the peripheral function section 181 includes the ADC 181a, the digital input section 181b, the digital output section 181c, and the PWM control section 181d. Thus, the device driver unit 141 includes an ADC driver 141a as a device driver for the ADC 181a, a DIO driver 141b as a device driver for the digital input section 181b and the digital output section 181c, and a PWM driver 141d as a device driver for the PWM control section 181d. That is, the ADC driver 141a is connected to the ADC 181a, the DIO driver 141b is connected to the digital input section 181b and the digital output section 181c, and the PWM driver 141d is connected to the PWM control section 181d.

The device driver is hardware-dependent software. In general, software (for example, an operating system and the like) that is not hardware-dependent is also installed in the basic software layer 140.

In the middleware layer 130, a mapping module 133 is installed, and the mapping module 133 includes one or a plurality of first communication packets 131 for data exchange with the application 121 and one or a plurality of second communication packets 132 for data exchange with the device drivers.

In the example illustrated in FIG. 2A, IO_1, IO_2, . . . IO_X (X is a natural number) are implemented as the first communication packet 131. As the second communication packet 132, (1) ADC_1, ADC_2, . . . ADC_L (L is a natural number) for data exchange with the ADC driver 141a, (2) DI_1, DI_2, . . . DI_M (M is a natural number) and DO_1, DO_2, . . . DO_N (N is a natural number) for data exchange with the DIO driver 141b, and (3) PWM_1, PWM_2, . . . PWM_Q (Q is a natural number) for data exchange with the PWM driver 141d are implemented. In addition, although not specifically illustrated, the following connection relationships are established in FIG. 2A. The communication packet ADC_1 is connected to the channel CHa1 of the ADC 181a, and the communication packet ADC_2 is connected to the channel CHa2 of the ADC 181a. The communication packet DI_1 is connected to the channel CHb1 of the digital input section 181b, and the communication packet DI_2 is connected to the channel CHb2 of the digital input section 181b. The communication packet DO_1 is connected to the channel CHc1 of the digital output section 181c, and the communication packet DO_2 is connected to the channel CHc2 of the digital output section 181c. The communication packet PWM_1 is connected to the channel CHd1 of the PWM control section 181d, and the communication packet PWM_2 is connected to the channel CHd2 of the PWM control section 181d.

The mapping module 133 generates a communication path between the application layer 120 and the device driver on the basis of a mapping table 166 that is stored in the memory 160. In the mapping table 166, connection relationships between the first communication packet 131 and the second communication packet 132 are defined. More specifically, for example, in the case where the plural first communication packets 131 and the plural second communication packets 132 are available, the communication packets as connection targets are each defined. In a case of FIG. 2A, it is defined that a connection target of the communication packet IO_1 is the communication packet ADC_1, a connection target of the communication packet IO_2 is the communication packet DI_2, a connection target of the communication packet IO_3 is the communication packet DO_1, and a connection target of the communication packet IO_X is the communication packet PWM_1. However, any one of the first communication packet 131 and the second communication packet 132 may be a single packet.

In the middleware layer 130, the Runtime Environment (RTE) that abstracts and connects the application 121 and the software installed in the basic software layer 140 may be implemented between the application layer 120 and the mapping module 133.

<Memory>

The memory 160 includes, as a storage area: a code area 161 in which the program 162 for operating the CPU 150 is stored; and a rewritable data area 165 in which processing results by the CPU 150 and data such as the mapping table 166 are stored. For example, in a design stage of the in-vehicle equipment controller 100, the program 162 that is created in advance is compiled and installed in the code area 161. As described above, data for specifying the connection relationships between the first communication packet 131 and the second communication packet 132 is stored in the mapping table 166.

[Operation Example of in-Vehicle Equipment Controller]

Next, a description will be made on exemplary operation of the in-vehicle equipment controller 100 with reference to FIG. 2A and FIG. 2B. A description will herein be made on the assumption that the in-vehicle equipment controller 100 is installed in the first zone ECU 41. The sensor device 200 and the actuator 300 that are arranged in the front left zone of the vehicle 1 are mainly connected to the first zone ECU 41. More specifically, the keyless sensor 211, the PW switch 212, the locking device 301, and the electric power window device 302 are connected to the first zone ECU 41, for example.

In the case of FIG. 2A, the keyless sensor 211, the PW switch 212, the locking device 301, and the electric power window device 302 are respectively connected to the channel CHa1 of the ADC 181a, the channel CHa2 of the ADC 181a, the channel CHc1 of the digital output section 181c, and the channel CHd1 of the PWM control section 181d. In a case of FIG. 2B, connection destinations of the PW switch 212 and the electric power window device 302 are changed from those in the case of FIG. 2A. More specifically, in the case of FIG. 2B, (1) the connection destination of the PW switch 212 is changed from the channel CHa2 of the ADC 181a in the case of FIG. 2A to the channel CHb2 of the digital input section 181b, and (2) the connection destination of the electric power window device 302 is changed from the channel CHd1 of the PWM control section 181d in the case of FIG. 2A to the channel CHd2 thereof. For example, such changes may be made when the sensor device 200 or the actuator 300 is replaced for a vehicle model change, a vehicle design change, or the like. In addition, there possibly occurs such a situation where both of the connection mode in FIG. 2A and the connection mode in FIG. 2B are required for a case where a common program is used among mutually different vehicle models. In FIG. 2A and FIG. 2B, SEN- SORS A, B and ACTUATORS A, B are illustrated. However, in order to facilitate understanding, these will be described by specifically using the sensor device 200 and the actuator 300 in the following description.

Figure 2B:
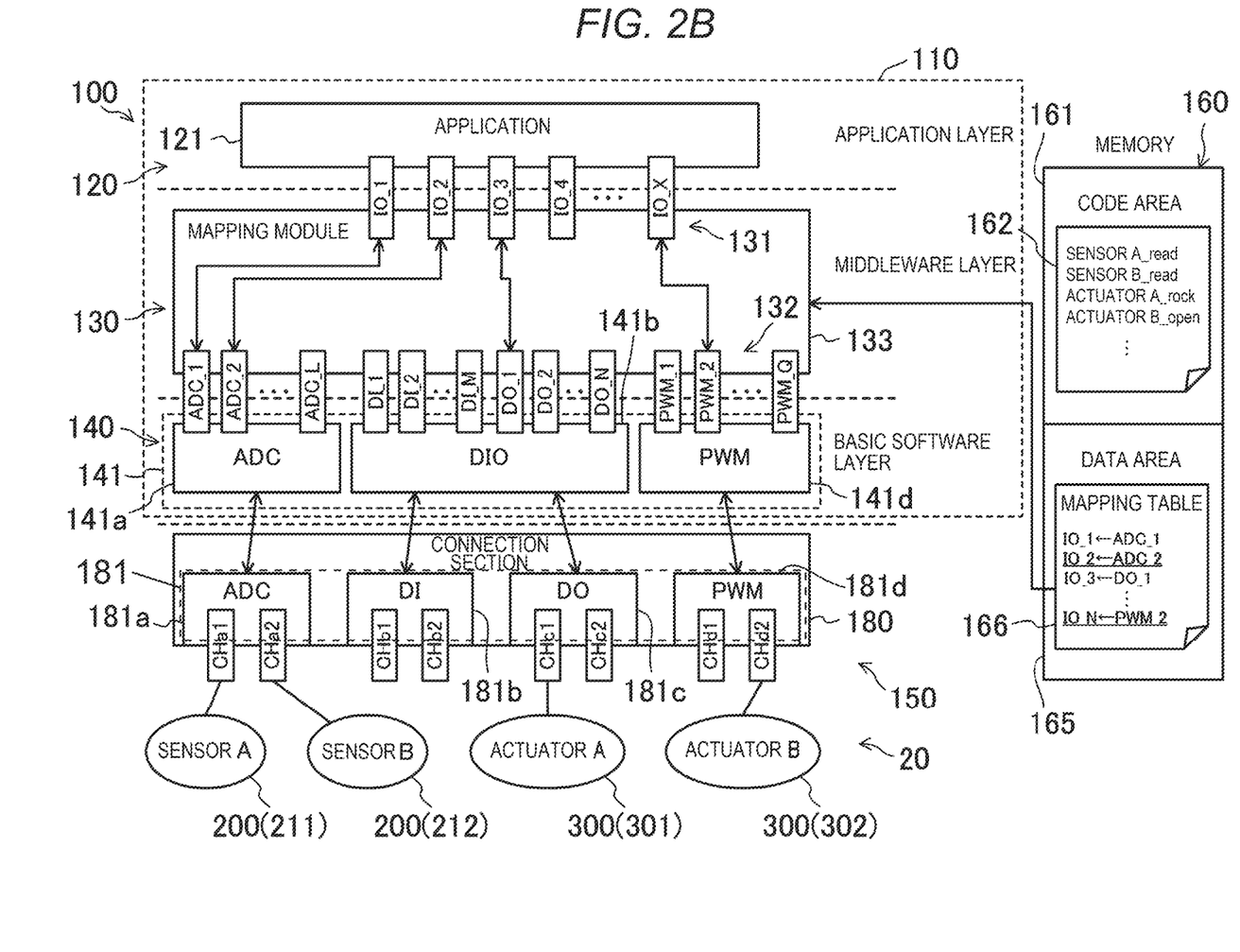
FIG. 2B is a view illustrating a configuration example of the in-vehicle equipment controller according to an embodiment.

It is common to the cases of FIG. 2A and FIG. 2B that reading processing of an input signal from the keyless sensor 211 and reading processing of operation information of the PW switch 212 are programmed as the program 162 in the code area 161. In addition, as the program 162, locking/unlocking processing of the locking device 301 in response to the input signal from the keyless sensor 211 and opening/closing drive processing of the electric power window device 302 in response to the operation information of the PW switch 212 are programmed.

Operation Example 1

In FIG. 2A, the application 121 packetizes a command for the reading processing of the input signal from the keyless sensor 211, and sends, as the communication packet IO_1, the packetized command to the mapping module 133. As described above, in the mapping module 133, the communication packet IO_1 is connected to the communication packet ADC_1. In this way, the ADC driver 141*a* is operated on the basis of the command from the application 121, and a signal received from the keyless sensor 211 and acquired by the ADC 181*a* is sent to the communication packet ADC_1 of the middleware layer 130. The communication packet ADC_1 is sent to the communication packet IO_1.

Then, when receiving the input signal from the keyless sensor 211 as the communication packet IO_1, the application 121 packetizes a command for the locking/unlocking processing of the locking device 301 on the basis of the input signal, and sends, as the communication packet IO_3, the packetized command to the mapping module 133. As described above, in the mapping module 133, the communication packet IO_3 is connected to the communication packet DO_1. In this way, the DIO driver 141*b* is operated on the basis of the command from the application 121, and the locking device 301 locks or unlocks the side door.

Operation Example 2

In FIG. 2A, the application 121 packetizes a command for the reading processing of the operation information from the PW switch 212, and sends, as the communication packet IO_2, the packetized command to the mapping module 133. As described above, in the mapping module 133, the communication packet IO_2 is connected to the communication packet DI_2. In this way, the DIO driver 141*b* is operated on the basis of the command from the application 121, and the operation signal of the PW switch 212, which is acquired by the digital input section 181*b*, is sent to the communication packet DI_2 of the middleware layer 130. The communication packet DI_2 is sent to the communication packet IO_2.

Then, when receiving the operation signal from the PW switch 212 as the communication packet IO_2, the application 121 packetizes a command for the opening/closing drive processing of the electric power window device 302 on the basis of the operation signal, and sends, as the communication packet IO_X, the packetized command to the mapping module 133. As described above, in the mapping module 133, the communication packet IO_X is connected to the communication packet PWM_1. In this way, the PWM driver 141*d* is operated on the basis of the command from the application 121, and the opening/closing operation of the electric power window device 302 is performed.

Here, it is assumed that the connection changes are made from FIG. 2A to FIG. 2B. In such a case, in this embodiment, the program 162 in the code area 161 is not changed, and the mapping table 166 in the data area 165 is rewritten. More specifically, in the example of FIG. 2B, in the mapping table 166, the connection destination of the PW switch 212 is changed to the channel CHb2 of the digital input section 181*b*, and the connection destination of the electric power window device 302 is changed to the channel CHd2 of the PWM control section 181*d*. In the mapping module 133, on the basis of the changes in the mapping table 166, the communication packet IO_2 is connected to the communication packet ADC_2, and the communication packet IO_X is connected to the communication packet PWM_2.

In FIG. 2B, the application 121 packetizes the command for the reading processing of the operation information from the PW switch 212, and sends, as the communication packet IO_2, the packetized command to the mapping module 133. The operation so far is the same as that in FIG. 2A. In the mapping module 133, due to the connection change, the communication packet IO_2 is connected to the communication packet ADC_2. In this way, the ADC driver 141*a* is operated on the basis of the command from the application 121, and the operation signal of the PW switch 212, which is acquired from the channel CHa2 of the ADC 181*a*, is sent to the communication packet ADC_2 of the middleware layer 130.

Then, when receiving the operation signal from the PW switch 212 as the communication packet IO_2, the application 121 packetizes the command for the opening/closing drive processing of the electric power window device 302 on the basis of the operation signal, and sends, as the communication packet IO_X, the packetized command to the mapping module 133. The operation so far is the same as that in FIG. 2A. In the mapping module 133, due to the connection change, the communication packet IO_X is connected to the communication packet PWM_2. In this way, the PWM driver 141*d* is operated on the basis of the command from the application 121, and the opening/closing operation of the electric power window device 302 is performed.

Figure 3A:
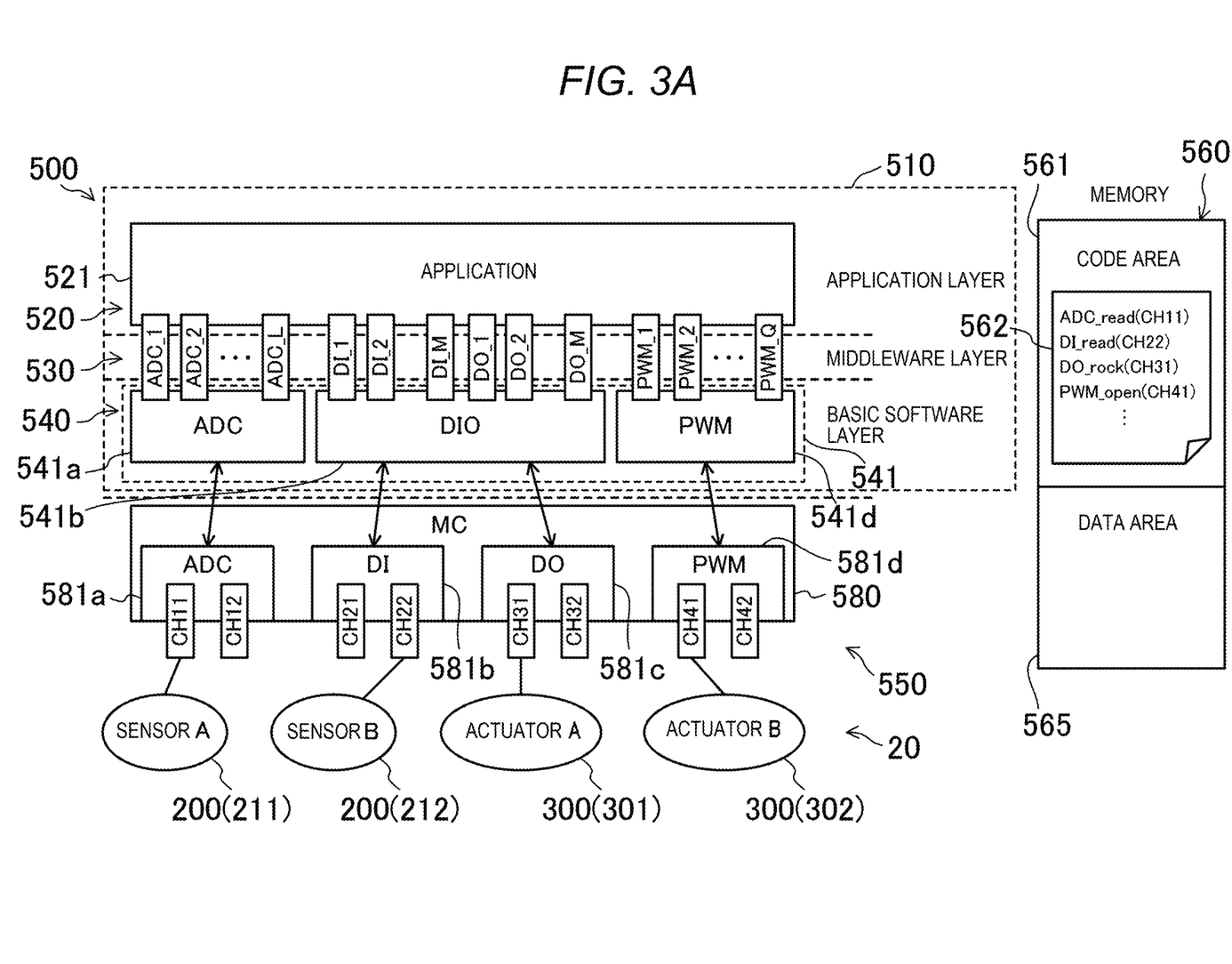
FIG. 3A is a view illustrating a configuration example of an in-vehicle equipment controller according to a comparative example.
Figure 3B:
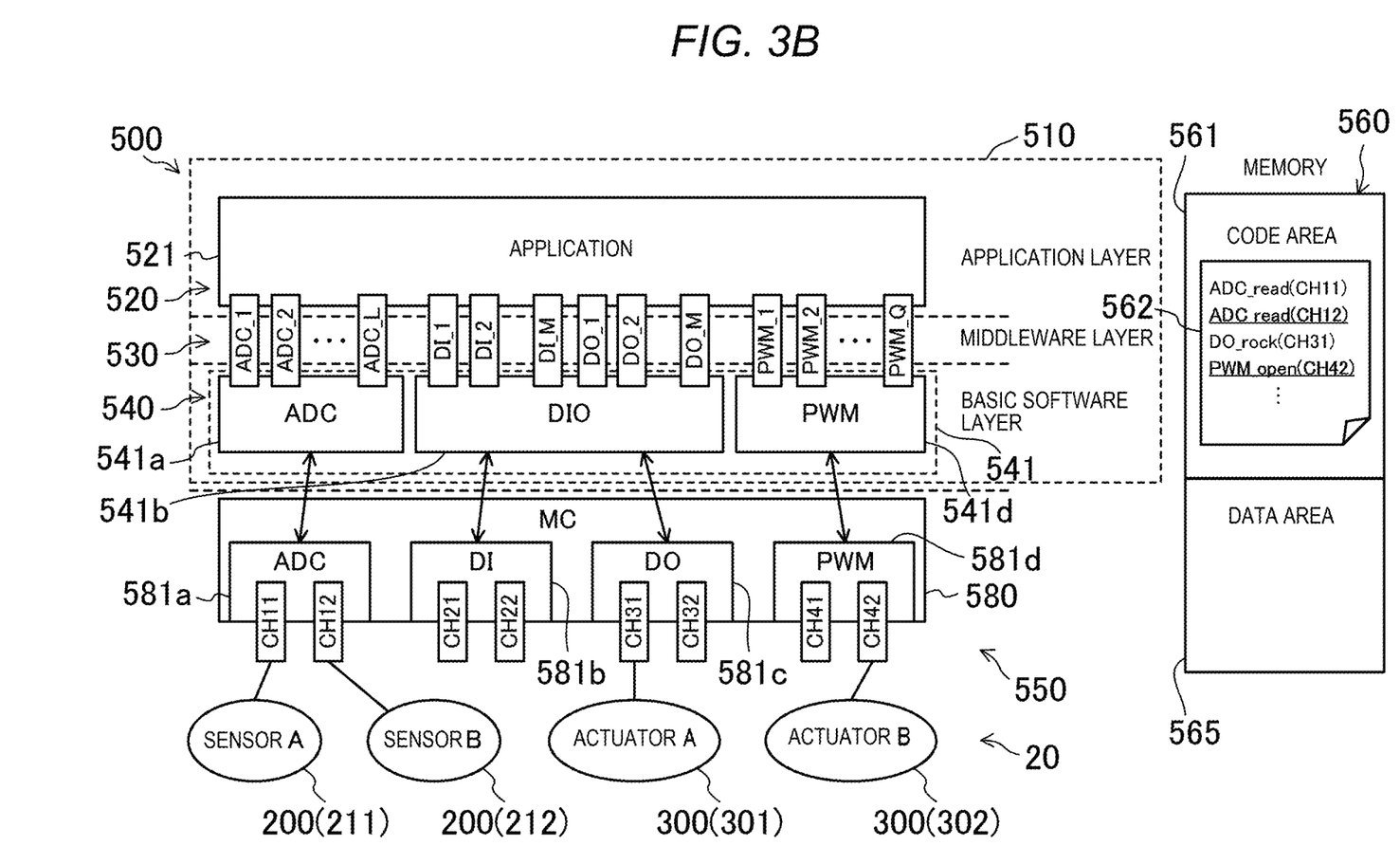
FIG. 3B is a view illustrating a configuration example of the in-vehicle equipment controller according to the comparative example.

FIG. 3A and FIG. 3B each illustrate a comparative example. In FIG. 3A and FIG. 3B, a single communication packet is installed as a middleware layer 530. In accordance with such a change, a program 562 has a different configuration. However, the rest of the configuration is the same as that in FIG. 2A and FIG. 2B. The components that are common in FIGS. 2 (2A, 2B) and FIGS. 3 (3A, 3B) will be denoted by the reference signs and numerals having the same numbers in the last two digits or having the same numbers in the last two digits and the following sign. For example, an in-vehicle equipment controller 500 corresponds to the in-vehicle equipment controller 100; a software configuration 510 corresponds to the software configuration 110; an application layer 520 corresponds to the application layer 120; an application 521 corresponds to the application 121; a basic software layer 540 corresponds to the basic software layer 140; a device driver unit 541 corresponds to the device driver unit 141; an ADC driver 541*a* corresponds to the ADC driver 141*a*; a DIO driver 541*b* corresponds to the DIO driver 141*b*; a PWM driver 541*d* corresponds to the PWM driver 141*d*; a memory 560 corresponds to the memory 160; a rewritable data are 565 corresponds to the rewritable data area 165; a peripheral function unit 580 corresponds to the peripheral function unit 180; an analog-to-digital converter 581*a* corresponds to the analog-to-digital converter 181*a*; a digital input section 581*b* corresponds to the digital input section 181*b*; a digital output section 581c corresponds to the digital output section 181c; and a PWM control section 581d corresponds to the PWM control section 181d.

More specifically, in a code area 561, the program 562 illustrated in FIG. 3A implements processing to operate a CPU 550. Furthermore, in the program 562, connection destination channels in a peripheral function section 581 are set for communication packets, each of which sends a processing content, in a middleware layer 530. With such a configuration, similar operation to that in the above embodiment can be performed.

Meanwhile, in the case where connection changes are made for the in-vehicle equipment 20 from FIG. 3A to FIG. 3B, in the comparative example, the program 562 in the code area 561 has to be changed.

As it has been described so far, in the in-vehicle equipment controller 100 according to this embodiment, the CPU 150 has, as the software configuration, the application layer 120, the middleware layer 130, and the device driver unit 141. In the middleware layer 130, the first communication packet 131 for the data exchange with the application 121 and the second communication packet 132 for the data exchange with the device driver are installed. The memory 160 stores the rewritable mapping table 166 that specifies the connection relationships between the first communication packet 131 and the second communication packet 132. In the middleware layer 130, the communication path between the application layer 120 and the device driver unit 141 is generated on the basis of the mapping table 166.

In this way, even in the case where the connection destination of the in-vehicle equipment 20 is desired to be changed in the peripheral function unit 180, the connection destination of the in-vehicle equipment 20 can be changed by changing the mapping table 166 without changing the program 162 in the code area 161. In the case where a small change is made to the program 162 in the code area 161, all the codes have to be compiled again and rewritten in the memory 160. However, such a task is unnecessary with the configuration in this embodiment. Therefore, it is possible to significantly reduce software development man-hours.

The technique disclosed herein is not limited to that in the above-described embodiment and can be substituted with another technique within the scope that does not depart from the gist of the claims. The above-described embodiment is merely illustrative, and thus the scope of the present disclosure should not be interpreted in a restrictive manner. The scope of the present disclosure is defined by the claims, and all modifications and changes falling within equivalents of the claims fall within the scope of the present disclosure.

INDUSTRIAL APPLICABILITY

The technique disclosed herein is useful for design of the in-vehicle equipment controller.

What is claimed is:

1. An in-vehicle equipment controller, comprising:
circuitry configured to control in-vehicle equipment; and
a memory, wherein
the circuitry has, as a software configuration:
an application layer in which an application implementing functions for the in-vehicle equipment is installed; and
a middleware layer in which a device driver, one or a plurality of first communication packets, and a plurality of second communication packets are installed, the device driver being configured to convert a command received from the application into a hardware command, the first communication packet exchanging data with the application, and the second communication packets exchanging data with the device driver, and
a rewritable mapping table that specifies a connection relationship between the first communication packet and each of the second communication packets; wherein the rewritable mapping table is stored in the memory, and
in the middleware layer, a communication path between the application layer and the device driver is generated based on the re-writable mapping table.

2. A vehicle control system, comprising:
a plurality of zone ECUs, each of which is arranged per specified zone in a vehicle; and
central processing circuitry that controls the plurality of the zone ECUs, wherein
one or the plurality of the zone ECUs include the in-vehicle equipment controller according to claim 1.

3. The in-vehicle equipment controller of claim 1, wherein the application is configured to
packetize a first command for a reading processing of an input signal from a keyless sensor,
send, as a first communication packet, the packetized command to a mapping module,
wherein the device driver is operated based on the command from the application, and a signal received from the keyless sensor is sent to a second communication packet of the middleware layer,
packetize a second command for a locking and unlocking processing of a locking device based on the input signal, and
send, as a communication packet, the second packetized command to the mapping module in response to receiving the input signal from the keyless sensor as the first communication packet.

4. The in-vehicle equipment controller of claim 1, wherein the application is configured to
packetize a first command for a reading processing of operation information from a power window (PW) switch,
send, as a first communication packet, the first packetized command to a mapping module,
wherein the device driver is operated based on the command from the application, and an operation signal of the PW switch is sent to a second communication packet of the middleware layer,
packetize a second command for opening and closing drive processing of an electric power window based on the operation signal, and
send, as the first communication packet, the second packetized command to the mapping module in response to receiving the operation signal from the PW switch as the first communication packet.

5. The in-vehicle equipment controller of claim 1, wherein the circuitry is configured to
determine whether in-vehicle equipment connected to the in-vehicle equipment controller is changed, and
in response to a determination that the in-vehicle equipment connected to the in-vehicle equipment controller is changed, operate the in-vehicle equipment by rewriting the table in a mapping module without correcting a code related to the application layer.

6. The in-vehicle equipment controller of claim 1, wherein the circuitry is configured to
determine whether a connection destination port is changed, and in response to a determination that the connection destination port is changed, operate the in-vehicle equipment by rewriting the table in a mapping module without correcting a code related to the application layer.

7. A vehicle, comprising:
an in-vehicle equipment controller, wherein the in-vehicle equipment controller includes
circuitry configured to control in-vehicle equipment; and
a memory, wherein
the circuitry has, as a software configuration:
- an application layer in which an application implementing functions for the in-vehicle equipment is installed; and
- a middleware layer in which a device driver, one or a plurality of first communication packets, and a plurality of second communication packets are installed, the device driver being configured to convert a command received from the application into a hardware command, the first communication packet exchanging data with the application, and the second communication packets exchanging data with the device driver, and
a rewritable mapping table that specifies a connection relationship between the first communication packet and each of the second communication packets, wherein the rewritable mapping table is stored in the memory, and
in the middleware layer, a communication path between the application layer and the device driver is generated based on the rewritable mapping table.

8. A vehicle control system, comprising
a plurality of zone ECUs, each of which is arranged per specified zone in a vehicle; and
central processing circuitry that controls the plurality of the zone ECUs, wherein
one or the plurality of the zone ECUs include the in-vehicle equipment controller according to claim 7.

9. The vehicle of claim 7, further comprising:
a keyless sensor.

10. The vehicle of claim 9, wherein the application is configured to
packetize a first command for a reading processing of an input signal from the keyless sensor,
send, as a first communication packet, the packetized command to a mapping module,
wherein the device driver is operated based on the command from the application, and a signal received from the keyless sensor is sent to a second communication packet of the middleware layer,
packetize a second command for a locking and unlocking processing of a locking device based on the input signal, and
send, as a communication packet, the second packetized command to the mapping module in response to receiving the input signal from the keyless sensor as the first communication packet.

11. The vehicle of claim 7, further comprising:
a power window (PW) switch.

12. The vehicle of claim 11, wherein the application is configured to
packetize a first command for a reading processing of operation information from the PW switch,
send, as a first communication packet, the first packetized command to a mapping module,
wherein the device driver is operated based on the command from the application, and an operation signal of the PW switch is sent to a second communication packet of the middleware layer,
packetize a second command for opening and closing drive processing of an electric power window based on the operation signal, and
send, as the first communication packet, the second packetized command to the mapping module in response to receiving the operation signal from the PW switch as the first communication packet.

13. The vehicle of claim 7, wherein the circuitry is configured to
determine whether in-vehicle equipment connected to the in-vehicle equipment controller is changed, and
in response to a determination that the in-vehicle equipment connected to the in-vehicle equipment controller is changed, operate the in-vehicle equipment by rewriting the table in a mapping module without correcting a code related to the application layer.

14. The vehicle of claim 7, wherein the circuitry is configured to
determine whether a connection destination port is changed, and
in response to a determination that the connection destination port is changed, operate the in-vehicle equipment by rewriting the table in a mapping module without correcting a code related to the application layer.

* * * * *